(12) United States Patent
Ogata et al.

(10) Patent No.: US 10,615,409 B2
(45) Date of Patent: Apr. 7, 2020

(54) ELECTRODE ACTIVE MATERIAL, ELECTRODE AND SECONDARY BATTERY INCLUDING THE SAME, AND METHOD OF PREPARING THE ELECTRODE ACTIVE MATERIAL

(71) Applicants: Samsung Electronics Co., Ltd., Suwon-si, Gyeonggi-do (KR); Samsung SDI Co., Ltd., Yongin-si, Gyeonggi-do (KR)

(72) Inventors: Ken Ogata, Yokohama (JP); Koichi Takei, Hwaseong-si (KR); Mijong Kim, Suwon-si (KR); Minje Park, Suwon-si (KR); Kanghee Lee, Suwon-si (KR); Byoungsun Lee, Seoul (KR); Seongho Jeon, Pohang-si (KR)

(73) Assignees: SAMSUNG ELECTRONICS CO., LTD., Gyeonggi-Do (KR); SAMSUNG SDI CO., LTD., Gyeonggi-Do (KR)

( * ) Notice: Subject to any disclaimer, the term of this patent is extended or adjusted under 35 U.S.C. 154(b) by 758 days.

(21) Appl. No.: 15/161,879

(22) Filed: May 23, 2016

(65) Prior Publication Data
US 2017/0117539 A1    Apr. 27, 2017

(30) Foreign Application Priority Data
Oct. 22, 2015 (KR) .......................... 10-2015-0147539

(51) Int. Cl.
H01M 4/36 (2006.01)
H01M 4/04 (2006.01)
(Continued)

(52) U.S. Cl.
CPC ......... *H01M 4/366* (2013.01); *H01M 4/0419* (2013.01); *H01M 4/0471* (2013.01);
(Continued)

(58) Field of Classification Search
None
See application file for complete search history.

(56) References Cited

U.S. PATENT DOCUMENTS

| 7,871,727 B2 | 1/2011 | Obrovac et al. |
| 2012/0264020 A1 | 10/2012 | Burton et al. |

(Continued)

FOREIGN PATENT DOCUMENTS

| CN | 102509781 A | 6/2012 |
| CN | 103346324 A | 10/2013 |

(Continued)

OTHER PUBLICATIONS

Machine Translation of KR 10-2009-0109225 (Year: 2009).*
(Continued)

*Primary Examiner* — Wyatt P McConnell
(74) *Attorney, Agent, or Firm* — Cantor Colburn LLP

(57) ABSTRACT

A secondary particle-type electrode active material including: at least one pore; and a shell surrounding the at least one pore, wherein the shell includes a first layer and a second layer, the first layer including a first carbonaceous material, and the second layer including a composite and disposed on the first layer, wherein the composite includes a silicon material and a second carbonaceous material. Also, an electrode and a secondary battery include the electrode active material.

28 Claims, 8 Drawing Sheets

(51) Int. Cl.
  *H01M 4/587* (2010.01)
  *H01M 4/13* (2010.01)
  *H01M 4/38* (2006.01)
  *H01M 4/133* (2010.01)
  *H01M 4/583* (2010.01)
  *H01M 10/0525* (2010.01)

(52) U.S. Cl.
  CPC ........... *H01M 4/0483* (2013.01); *H01M 4/13* (2013.01); *H01M 4/133* (2013.01); *H01M 4/386* (2013.01); *H01M 4/583* (2013.01); *H01M 4/587* (2013.01); *H01M 10/0525* (2013.01)

(56) References Cited

U.S. PATENT DOCUMENTS

| | | |
|---|---|---|
| 2013/0059203 A1 | 3/2013 | Hong et al. |
| 2014/0087255 A1 | 3/2014 | Kim et al. |
| 2014/0242460 A1 | 8/2014 | Woo et al. |
| 2014/0248543 A1 | 9/2014 | Zhu et al. |

FOREIGN PATENT DOCUMENTS

| | | |
|---|---|---|
| CN | 104638252 A | 5/2015 |
| EP | 2711338 A1 | 3/2014 |
| JP | 2010501970 A | 1/2010 |
| JP | 2013065569 A | 4/2013 |
| KR | 1020090109225 A | 10/2009 |
| KR | 1020110124728 A | 11/2011 |
| KR | 1020130063486 A | 6/2013 |
| WO | 2011142575 A2 | 11/2011 |

OTHER PUBLICATIONS

Liu et al., "A pomegranate-inspired nanoscale design for large-volume-change lithium battery anode", Nature Nanotechnology, vol. 9, 2014, pp. 187-192.

Magasinski et al., "High-performance lithium-ion anodes using a hierarchical bottom-up approach", Nature Materials, vol. 9, 2010, pp. 353-358.

\* cited by examiner

ELECTRODE ACTIVE MATERIAL, ELECTRODE AND SECONDARY BATTERY INCLUDING THE SAME, AND METHOD OF PREPARING THE ELECTRODE ACTIVE MATERIAL

CROSS-REFERENCE TO RELATED APPLICATION

This application claims the benefit of and priority to Korean Patent Application No. 10-2015-0147539, filed on Oct. 22, 2015, in the Korean Intellectual Property Office, and all the benefits accruing therefrom under 35 U.S.C. § 119, the content of which is incorporated herein in its entirety by reference.

BACKGROUND

1. Field

The present disclosure relates to an electrode active material, an electrode, and a secondary battery that include the electrode active material, and a method of preparing the electrode active material.

2. Description of the Related Art

A silicon-based material has received attention for use as an electrode active material for a high-capacity secondary battery because silicon has a theoretical capacity of about 3,570 milliAmpere hours per gram (mAh/g) at room temperature. However, the silicon-based material may undergo a volume expansion (up to about 300%) during intercalation and deintercalation of lithium ions.

The volume expansion of the silicon-based material may cause pulverization of the silicon-based material and mechanical strain associated with difficulties in controlling a solid electrolyte interphase (SEI) layer. Thus, an electrode active material including the silicon-based material may also cause a problem of sudden deterioration in charge and discharge characteristics, such as capacity and lifespan characteristics at initial steps, of a battery including the electrode active material.

To address such a problem above, the study of modification of a shape or structure of the silicon-based material, or the study of formation of a composite of the silicon-based material and other materials has been made with the objective of maintaining the high capacity of the silicon-based material and improving charge and discharge characteristics of a battery including the silicon-based material.

However, simple modification of a shape and/or structure of the silicon-based material or simple formation of a composite of the silicon-based material and other materials has not been shown sufficient to improve charge and discharge characteristics of a battery including the silicon-based material.

Therefore, there is still a need to develop an improved electrode active material, and a method of preparing the electrode active material.

SUMMARY

Provided is a self-assembled secondary particle-type electrode active material having improved charge and discharge characteristics by controlling the pore size in the electrode active material.

Provided is an electrode including the electrode active material.

Provided is a secondary battery including the electrode.

Provided is a method of preparing the electrode active material.

Additional aspects will be set forth in part in the description which follows and, in part, will be apparent from the description, or may be learned by practice of the presented embodiments.

According to an aspect of an embodiment, a secondary particle-type electrode active material includes: at least one pore; and a shell surrounding the at least one pore, wherein the shell includes a first layer and a second layer, the first layer including a first carbonaceous material, and the second layer including a composite and disposed on the first layer, wherein the composite includes a silicon material and a second carbonaceous material.

According to an aspect of another embodiment, an electrode includes the secondary particle-type electrode active material.

According to an aspect of another embodiment, a secondary battery includes the electrode.

According to an aspect of another embodiment, a method of preparing a secondary particle-type electrode active material includes: spray-drying a slurry including a first carbonaceous material, a silicon material, and a second carbonaceous material to form a dry powder; and heat treating the dried powder in an inert atmosphere to prepare a secondary particle-type electrode active material, wherein the secondary particle-type electrode active material includes at least one pore; and a shell surrounding the at least one pore, wherein the shell includes a first layer and a second layer, the first layer including the first carbonaceous material, and the second layer including a composite and disposed on the first layer, and wherein the composite includes a silicon material and the second carbonaceous material.

BRIEF DESCRIPTION OF THE DRAWINGS

These and/or other aspects will become apparent and more readily appreciated from the following description of the embodiments, taken in conjunction with the accompanying drawings in which:

FIGS. 5A to 5C shows the results of energy dispersive spectroscopy (EDS) analysis of a secondary particle-type electrode active material according to Example 4, in which FIG. 5A is a secondary electron image, FIG. 5B is a silicon map, and FIG. 5 C is a carbon map of the particle shown in FIG. 5A;

DETAILED DESCRIPTION

Figure 1:
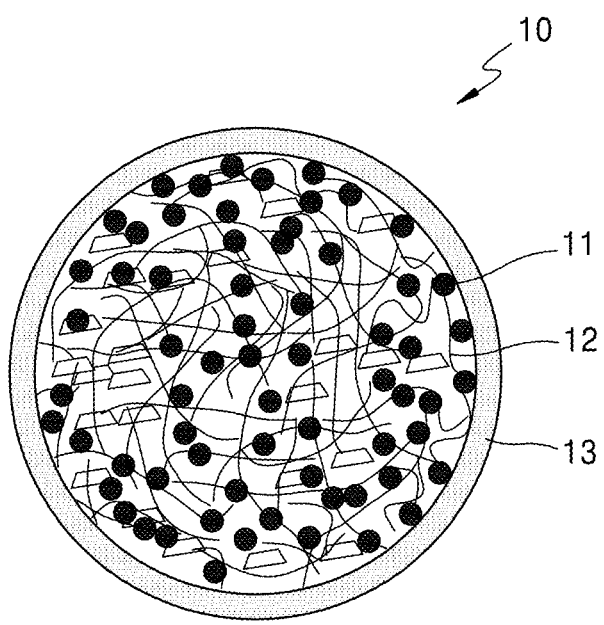
FIG. 1 is a schematic diagram of a structure of a secondary particle-type electrode active material according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, "or" means "and/or." As used herein, the term "and/or" includes any and all combinations of one or more of the associated listed items. Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer or section from another element, component, region, layer, or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, an electrode active material according to an embodiment, an electrode and a secondary battery that include the electrode active material, and a method of preparing the electrode active material will be disclosed in further detail. Provided herein below are embodiments and they should not limit the scope of the present disclosure.

The term "silicon-based material" or "silicon material" as used herein may be used to describe a material including at least about 5 weight percent (wt %) silicon (Si), based on a total weight of the silicon-based material. For example, the "silicon-based material" may include silicon in an amount of at least about 10 wt %, at least about 20 wt %, at least about 30 wt %, at least about 40 wt %, at least about 50 wt %, at least about 55 wt %, at least about 60 wt %, at least about 65 wt %, at least about 70 wt %, at least about 75 wt %, at least about 80 wt %, at least about 85 wt %, at least about 90 wt %, or at least about 95 wt %, or about 5 wt % to about 99.9 wt %, about 25 wt % to about 99 wt %, or about 50 wt % to about 90 wt %, based on a total weight of the silicon-based material.

The term "secondary particle-type electrode active material" as used herein may be used to describe an electrode active material in which components including at least one primary particle are in an aggregated form. Thus a particle of the electrode active material may be a secondary particle which comprises an agglomerated plurality of primary particles.

The term "including" or "includes" as used herein may be used to describe that another component may be further included and/or interposed in a component, unless otherwise described.

The term "a combination thereof" as used herein may be used to describe a mixture or combination of one or more components provided herein.

The term "disposed" or "arranged on" as used herein may be used to describe that one component can be placed next to and/or close to another element (e.g., attached to or placed on top of another element), and that such disposition or arrangement can be made according to methods such as spraying, layering, depositing, painting, dipping, bonding, coating, growing, or forming.

A silicon-based material undergoes a volume expansion up to about 300% during intercalation and deintercalation of lithium ions. To compensate for such a volume expansion, the silicon-based material is used in the form of silicon powder, a silicon nanocomposite, or a silicon nanowire, in various nano or micro sizes. Alternatively, the silicon-based material may be used in the form of a composite of silicon and graphite. Alternatively, the silicon-based material may be used in the form of a secondary particle-type electrode active material, as shown in FIG. 1.

FIG. 1 is a schematic diagram of a structure of a secondary particle-type electrode active material 10 according to an embodiment.

Referring to FIG. 1, the secondary particle-type electrode active material 10 includes a silicon-based material 11 and a carbonaceous material 12, such as a carbon nanotube (CNT) and/or a carbon nanofiber (CNF), wherein a carbonaceous coating layer 13 is disposed on a surface of the secondary particle-type electrode active material 10.

During intercalation of lithium ions, the silicon-based material 11 of the secondary particle-type electrode active material 10 may undergo a volume expansion outside of the secondary particle-type electrode active material 10. If such a volume expansion continuously occurs, stress may be caused in the secondary particle-type electrode active material 10, which may consequently result in collapse of the secondary particle-type electrode active material 10. In this regard, an electrode and a secondary battery that include the secondary particle-type electrode active material 10 may have a problem of a sudden decrease in charge/discharge characteristics, such as capacity and lifespan characteristics at initial steps.

A secondary particle-type electrode active material according to an embodiment includes at least one pore and a shell surrounding the at least one pore, wherein the shell includes a first layer including a first carbonaceous material and a second layer disposed on the first layer and including a composite of a silicon-based material and a second carbonaceous material.

Figure 2:
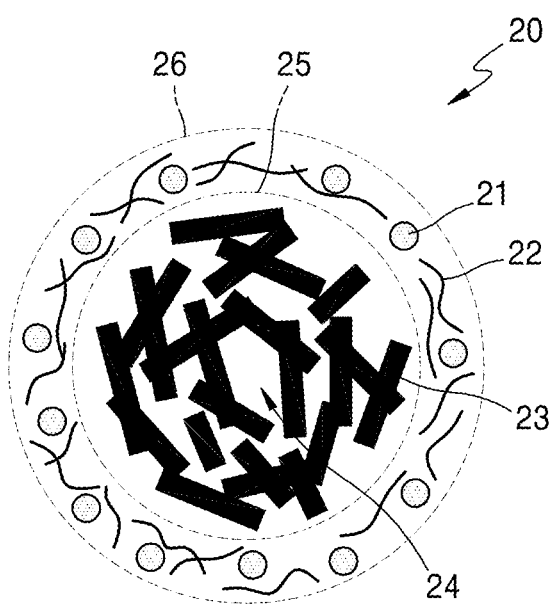
FIG. 2 is a schematic diagram of a structure of a secondary particle-type electrode active material according to another embodiment.

FIG. 2 is a schematic diagram of a structure of a secondary particle-type electrode active material 20 according to an embodiment.

Referring to FIG. 2, the secondary particle-type electrode active material 20 includes a pore 24 and a shell surrounding the pore 24, wherein the shell includes a first layer 25 including a first carbonaceous material 23 and a second layer 26 disposed on the first layer 25, and wherein the composite includes a composite of a silicon-based material 21 and a second carbonaceous material 22.

The silicon-based material 21 may be disposed in an outer layer of the shell, e.g., in the second layer 26 of the secondary particle-type electrode active material 20, such that the risk of stress on the secondary particle-type electrode active material 20 during intercalation and deintercalation of lithium ions may be reduced. Also, the second carbonaceous material 22 and the silicon-based material 21 may be included in the outer layer of the shell, e.g., the second layer 26 of the secondary particle-type electrode active material 20. In this regard, an electrically conductive path of the secondary particle-type electrode active material 20 may be ensured even during repeated intercalation and deintercalation of lithium ions, thereby avoiding the problem of disconnected particles.

An inner layer of the shell of the secondary particle-type electrode active material 20, e.g., the first layer 25, may include the first carbonaceous material 23, and an electrically conductive path of the secondary particle-type electrode active material 20 may be ensured even during repeated intercalation and deintercalation of lithium ions, thereby avoiding the problem of disconnected particles. Here, the first layer 25 may be configured to serve as a buffer layer against a volume expansion of the silicon-based material 21 during repeated intercalation and deintercalation of lithium ions. In addition, the pore 24 included in the secondary particle-type electrode active material 20 may be able to absorb stress caused by the volume expansion of the silicon-based material 21.

Accordingly, an electrode and a secondary battery, which include the secondary particle-type electrode active material 20, may have improved charge and discharge characteristics.

The first carbonaceous material 23 may have bulk density which is greater than a bulk density of the second carbonaceous material 22. The term "bulk density" as used herein may be used to denote a dry weight per unit volume of a solid material regardless of the presence of a pore.

Due to the difference between the bulk density of the first carbonaceous material 23 and the bulk density of the second carbonaceous material 22, a preparation method capable of forming a pore, such as a spray-drying method, may be performed as follows. The first carbonaceous material 23 having a greater bulk density than the second carbonaceous material 22 may be positioned in the first layer 25, which is closer to the pore 24 other layers of the layers of the shell surrounding the pore 24, whereas the second carbonaceous material 22 having a lower bulk density than the first carbonaceous material 23 may be positioned in the second layer 26, which is distal from the pore 24 of the layers of the shell surrounding the pore 24. In an embodiment, the shell may comprise about 2 to about 100 layers. In an embodiment, the shell may have a thickness of about 1 to 100 µm. Also, the layer closest to the core may comprise the first carbonaceous material 23, and the layer distal to the core may comprise the second carbonaceous material 22.

The first carbonaceous material 23 may include graphite, graphene, or a combination thereof, and the graphite, if present, may be in the form of a flake or sheet. The first carbonaceous material 23 may be a flake type two-dimensional carbon structure.

Non-limiting examples of the graphite include acetylene black, Ketjen black, natural graphite, artificial graphite, carbon black, or a combination thereof.

Graphite in the form of a flake or a sheet may have an average aspect ratio of about 2 to about 5,000, for example, about 2 to about 4,000, for example, about 2 to about 3,000, for example, about 2 to about 2,000, or for example, about 2 to about 1,000.

The term "average aspect ratio" as used herein may be used to denote a ratio obtained by dividing an average particle length, which may correspond to an average particle diameter, by an average thickness. In an embodiment, the average aspect ratio may be a ratio of an average particle length, e.g., an average longest dimension, to an average particle width, e.g., an average shortest dimension.

The average aspect ratio may be measured by methods widely known in the art, and for example, it may be measured according to transmission electron microscopy (TEM) and/or scanning electron microscopy (SEM), and/or by using a measuring device utilizing a dynamic light-scattering method. The average aspect ratio may be obtained by dividing the measured average length by the measured average thickness value using the above-described devices.

Graphite in a flake or sheet form may have an average length in a range of, for example, about 1 micrometer (μm) to about 10 μm, for example, about 1 μm to about 9 μm, for example, about 1 μm to about 8 μm, for example, about 1 μm to about 7 μm, for example, about 1 μm to about 6 μm, or for example, about 1 μm to about 5 μm.

Graphite in the form of a flake or a sheet may have an average thickness in a range of, for example, about 0.1 μm to about 5 μm, for example, about 0.1 μm to about 4 μm, for example, about 0.1 μm to about 3 μm, for example, about 0.1 μm to about 2 μm, or for example, about 0.1 μm to about 1 μm.

Graphene may have a thickness of, for example, about 1 to about 100 layers. Graphene may have a BET specific surface area of, for example, about 10 square meters per gram (m$^2$/g) or more, for example, about 20 m$^2$/g or more, or about 30 m$^2$/g or more.

The amount of the first carbonaceous material 23 may be in a range of about 1 part to about 90 parts by weight, based on 100 parts by weight of the secondary particle-type electrode active material 20. For example, the amount of the first carbonaceous material 23 may be in a range of about 1 part to about 80 parts by weight, based on 100 parts by weight of the secondary particle-type electrode active material 20. For example, the amount of the first carbonaceous material 23 may be in a range of about 1 part to about 70 parts by weight, based on 100 parts by weight of the secondary particle-type electrode active material 20. For example, the amount of the first carbonaceous material 23 may be in a range of about 1 part to about 60 parts by weight, based on 100 parts by weight of the secondary particle-type electrode active material 20.

The second carbonaceous material 22 may include a carbon nanotube, a carbon nanofiber, a carbon nanowire, or a combination thereof.

The carbon nanotube may be a single-walled carbon nanotube, a double-walled carbon nanotube, or a multi-walled carbon nanotube. An average diameter of the carbon nanotube may be about 80 nanometers (nm) or less, for example, about 60 nm or less, for example, about 40 nm or less, or for example, about 20 nm or less, or may be in a range of about 1 nm to about 50 nm, about 5 nm to about 20 nm, or about 8 nm to about 15 nm. An average length of the carbon nanotube may be about 100 μm or less, for example, about 30 μm or less, or may be in a range of about 1 μm to about 200 μm, about 5 μm to about 100 μm, or about 15 μm to about 50 μm. When the average diameter of the carbon nanotube is within the ranges above, the carbon nanotube may provide sufficient mechanical strength. When the length of the carbon nanotube is within the ranges above, the transfer of charges may be allowed to pass rapidly from the surface of the secondary particle-type electrode active material 20 into the inside of the secondary particle-type electrode active material 20.

The carbon nanofiber may be in a fiber form of a carbon nanowire. An average diameter of the carbon nanowire may be in a range of about 10 nm to about 500 nm, for example, about 20 nm to about 400 nm, for example, about 20 nm to about 300 nm, for example, about 20 nm to about 200 nm, for example, about 20 nm to about 100 nm, or for example, about 40 nm to about 100 nm. An average length of the carbon nanowire may be in a range of about 100 nm to about 100 μm, for example, about 1 μm to about 75 μm, for example, about 0.1 μm to about 50 μm, or for example, about 1 μm to about 20 μm. An aspect ratio (i.e., an average length:an average wire diameter) of the carbon nanowire may be, for example, about 2000:1 or less, for example, about 1000:1 or less, or about 500:1 or less, e.g., about 10:1 to about 1000:1. When the average diameter of the carbon nanowire is within the range above, the carbon nanowire may obtain a sufficient mechanical strength. When the average length of the carbon nanowire is within the range above, the transfer of charges may be allowed to pass rapidly from the surface of the secondary particle-type electrode active material 20 into the inside of the secondary particle-type electrode active material 20.

The amount of the second carbonaceous material 22 may be in a range of about 1 part to about 80 parts by weight, based on 100 parts by weight of the secondary particle-type electrode active material 20. For example, the amount of the second carbonaceous material 22 may be in a range of about 1 part to about 60 parts by weight, based on 100 parts by weight of the secondary particle-type electrode active material 20. For example, the amount of the second carbonaceous material 22 may be in a range of about 1 part to about 40 parts by weight, based on 100 parts by weight of the secondary particle-type electrode active material 20. For example, the amount of the second carbonaceous material 22 may be in a range of about 1 part to about 20 parts by weight, based on 100 parts by weight of the secondary particle-type electrode active material 20.

An average particle diameter of the silicon-based material 21 may be in a range of about 10 nm to about 500 nm, for example, about 10 nm to about 400 nm, or for example, about 10 nm to about 300 nm.

The average particle diameter refers to "D50", which is a value of particle diameter at 50% in a cumulative distribution curve in which the particles are cumulatively distributed from the smallest to the largest particles based on 100% of the total number of particles. The D50 may be measured according to methods widely known in the art, and for example, may be measured by using a particle size analyzer or from a TEM or SEM image. Alternatively, the D50 may be measured by using a measuring device utilizing a dynamic light-scattering method, and then, by performing data analysis to count the number of particles in each size range, thereby calculating the average particle diameter.

The amount of the silicon-based material 21 may be in a range of about 1 part to about 99 parts by weight, based on 100 parts by weight of the secondary particle-type electrode active material 20.

A ratio of the amounts of the first carbonaceous material 23 to the silicon-based material 21 to the second carbonaceous material 22 may be in a range of about 40 to about 60 about 20 to about 40 about 5 to about 20, i.e., (about 40:about 60:about 20) to (about 40:about 5:about 20). For example, the ratio of the amounts of the first carbonaceous material 23 to the silicon-based material 21 to the second carbonaceous material 22 may be in a range of about 50 to about 60 to about 25 to about 35 to about 5 to about 15, i.e., i.e., (about 50:about 60:about 25) to (about 35:about 5:about 15). For example, the ratio of the amounts of the first carbonaceous material 23 to the silicon-based material 21 to the second carbonaceous material 22 may be in a range of about 60:about 25:about 5, about 50:about 35:about 5, about 60:about 25:about 15, or about 50:about 35:about 15.

The ratio of the amounts of the first carbonaceous material 23 to the silicon-based material 21 to the second carbonaceous material 22 may be selected within the ranges of the weight ratios above, so as to prepare a slurry having desired viscosity for preparing the secondary particle-type electrode active material 20. In this regard, the pore 24 may be produced in the desired size in the secondary particle-type electrode active material 20. Accordingly, an electrode and a secondary battery that includes the secondary particle-type electrode active material 20 may have improved coulombic efficiency and improved charge and discharge characteristics, such as lifespan characteristics.

The size of the pore 24 may be in a range of, for example, about 0.1 µm to about 100 µm, about 1 µm to about 50 µm, or about 5 µm to about 30 µm, but is not limited thereto. The secondary particle-type electrode active material 20 may have a porosity in a range of about 1% to about 99.9%, about 2% to about 99%, or about 4% to about 90%, based on 100% of the entire secondary particle-type electrode active material 20.

The shell may further include a binder.

The first layer 25, the second layer 26, or both the first layer 25 and the second layer 26 may include the binder. The binder may be pyrolyzed or carbonized.

The binder may include an organic binder, an aqueous binder, or a combination thereof.

Examples of the organic binder include a vinylidene fluoride/hexafluoropropylene copolymer, polyvinylidene fluoride, polyacrylonitrile, polymethyl methacrylate, polytetrafluoroethylene (PTFE), a combination of the above-described polymers, or a styrene-butadiene rubber-based polymer.

Examples of the aqueous binder include polyvinyl alcohol, poly(acrylic acid), poly(acrylic acid) substituted with an alkali cation or ammonium ion, polyimide, polyamideimide, polyvinylidene fluoride, carboxymethyl cellulose, a carboxymethyl cellulose sodium salt, a carboxymethyl cellulose ammonium salt, methylcellulose, hydroxymethylcellulose, hydroxypropyl cellulose, ethyl cellulose, diacetyl cellulose, polytetrafluoroethylene, polyethylene, polypropylene, or a combination thereof.

The amount of the binder may be in a range of about 0.1 part by weight to about 100 parts by weight, about 1 part by weight to about 50 parts by weight, or about 5 parts by weight to about 30 parts by weight, based on 100 parts by weight of the secondary particle-type electrode active material 20.

When the amount of the binder included in the secondary particle-type electrode active material 20 is within the ranges above, an electrode and a secondary battery that include the secondary particle-type electrode active material 20 may have improved charge and discharge characteristics, such as lifespan characteristics.

The first layer 25 and the second layer 26 may be continuous layers. When the first layer 25 and the second layer 26 constituting the shell of the secondary particle-type electrode active material 20 are continuous layers, an electrode and a secondary battery that include the secondary particle-type electrode active material 20 may have improved lifespan characteristics.

The thicknesses of the first layer 25 and the second layer 26 may each independently be in a range of about 1 µm to about 50 µm. The thicknesses of the first layer 25 and the second layer 26 may each independently be in a range of, for example, about 1 µm to about 40 µm, for example, about 1 µm to about 30 µm. The secondary particle-type electrode active material 20 including the shell having a thicknesses within the ranges above (i.e., the ranges of the thicknesses of each of the first layer 25 and the second layer 26) may ensure a sufficient electrically conductive path, which may avoid a capacity reduction in a battery. Thus, an electrode and a secondary battery that includes the secondary particle-type electrode active material 20 may have improved charge and discharge characteristics, such as lifespan characteristics.

The secondary particle-type electrode active material 20 may further include a third layer disposed on the second layer 26 and include the first carbonaceous material 23.

The secondary particle-type electrode active material 20 may be in a spherical form. The secondary particle-type electrode active material 20 may be, for example, in a spherical form or in an approximately spherical shape.

The secondary particle-type electrode active material 20 may further include a fourth layer disposed on the third layer and including an amorphous carbonaceous material.

The secondary particle-type electrode active material 20 may include the third layer and the fourth layer in a way that a plurality of layers may be alternately disposed on one another. That is, the third layer including the first carbonaceous material 23 may be disposed on the fourth layer, and the fourth layer including the amorphous carbonaceous material may be disposed on the third layer.

The secondary particle-type electrode active material 20 may be a self-assembly product electrode active material. Due to the difference between the bulk density of the first carbonaceous material 23 and the second carbonaceous material 22, a preparation method capable of forming a pore, such as a spray-drying method, may be performed so that the secondary particle-type electrode active material 20 may be prepared in a self-assembly manner. That is, the first carbonaceous material 23 having a greater bulk density than the second carbonaceous material 22 may be positioned in the first layer 25, which is close to the pore 24 among the layers of the shell surrounding the pore 24, whereas the second carbonaceous material 22 having a smaller bulk density than the first carbonaceous material 23 may be positioned in the second layer 26, which is distal from the pore 24 among the layers of the shell surrounding the pore 24.

The secondary particle-type electrode active material 20 may include a secondary particle having an average particle diameter in a range of about 1 µm to about 100 µm. For example, the secondary particle-type electrode active material 20 may include a secondary particle having an average particle diagram in a range of about 1 µm to about 80 µm, for example, about 1 µm to about 60 µm, for example, about 1 µm to about 40 µm, or for example, about 1 µm to about 30 µm. The average particle diameter refers to "D50", which is a value of particle diameter at 50% in a cumulative distribution curve in which the particles are cumulatively distributed from the smallest to the largest particles based on 100% of the total number of particles. The D50 may be measured according to the methods described above, and thus descriptions thereof will be omitted.

An electrode according to another aspect may include the above-described secondary particle-type electrode active material 20. Here, the secondary particle-type electrode active material 20 may be a cathode active material or an anode active material. For example, the secondary particle-type electrode active material 20 may be an anode active material.

A secondary battery according to another aspect may include the above-described electrode. Here, the electrode may be a cathode or an anode. For example, the electrode may be an anode.

The secondary battery may include a lithium ion secondary battery, a lithium sulfur secondary battery, or a lithium air secondary battery. For example, the secondary battery may include a lithium secondary battery. The lithium secondary battery may include: an anode including the above-described secondary particle-type electrode active material; a cathode facing the anode; and an electrolyte disposed between the anode and the cathode.

A cathode active material, an electrically conductive material, a binder, and a solvent may be mixed together to prepare a cathode slurry composition. The cathode slurry composition may be directly coated on a cathode current collector, and dried, thereby preparing a cathode plate on which a cathode active material layer is disposed. Alternatively, a cathode plate on which a cathode active material layer is disposed may be prepared by casting the cathode slurry composition on a separate support to form a cathode active material film, which may then be separated from the support and laminated on a cathode current collector.

As the cathode active material, any suitable lithium-containing metallic oxide may be used without particular limitation. For example, the cathode active material may include a composite oxide of lithium and a metal selected from cobalt (Co), manganese (Mn), nickel (Ni), or a combination thereof. For example, the cathode active material may include a compound represented by one of formulae such as $Li_aA_{1-b}B'_bD'_2$ (where $0.90 \leq a \leq 1$ and $0 \leq b \leq 0.5$); $Li_aE_{1-b}B'_bO_{2-c}D'_c$ (where $0.90 \leq a \leq 1$, $0 \leq b \leq 0.5$, and $0 \leq c \leq 0.05$); $LiE_{2-b}B'_bO_{4-c}D'_c$ (where $0 \leq b \leq 0.5$ and $0 \leq c \leq 0.05$); $Li_aNi_{1-b-c}Co_bB'_cD'_\alpha$ (where $0.90 \leq a \leq 1$, $0 \leq b \leq 0.5$, $0 \leq c \leq 0.05$, and $0 < \alpha \leq 2$); $Li_aNi_{1-b-c}Co_bB'_cO_{2-\alpha}F'_\alpha$ (where $0.90 \leq a \leq 1$, $0 \leq b \leq 0.5$, $0 \leq c \leq 0.05$, and $0 < \alpha < 2$); $Li_aNi_{1-b-c}Co_bB'_cO_{2-\alpha}F'_2$ (where $0.90 \leq a \leq 1$, $0 \leq b \leq 0.5$, $0 \leq c \leq 0.05$, and $0 < \alpha < 2$); $Li_aNi_{1-b-c}Mn_bB'_cD'_\alpha$ (where $0.90 \leq a \leq 1$, $0 \leq b \leq 0.5$, $0 \leq c \leq 0.05$, and $0 < \alpha \leq 2$); $Li_aNi_{1-b-c}Mn_bB'_cO_{2-\alpha}F'_\alpha$ (where $0.90 \leq a \leq 1$, $0 \leq b \leq 0.5$, $0 \leq c \leq 0.05$, and $0 < \alpha < 2$); $Li_aNi_{1-b-c}Mn_bB'_cO_{2-\alpha}F'_2$ (where $0.90 \leq a \leq 1$, $0 \leq b \leq 0.5$, $0 \leq c \leq 0.05$, and $0 < \alpha < 2$); $Li_aNi_bE_cG_dO_2$ (where $0.90 \leq a \leq 1$, $0 \leq b \leq 0.9$, $0 \leq c \leq 0.5$, and $0.001 \leq d \leq 0.1$); $Li_aNi_bCo_cMn_dG_eO_2$ (where $0.90 \leq a \leq 1$, $0 \leq b \leq 0.9$, $0 \leq c \leq 0.5$, $0 \leq d \leq 0.5$, and $0.001 \leq e \leq 0.1$); $Li_aNiG_bO_2$ (where $0.90 \leq a \leq 1$ and $0.001 \leq b \leq 0.1$); $Li_aCoG_bO_2$ (where $0.90 \leq a \leq 1$ and $0.001 \leq b \leq 0.1$); $Li_aMnG_bO_2$ (where $0.90 \leq a \leq 1$ and $0.001 \leq b \leq 0.1$); $Li_aMn_2G_bO_4$ (where $0.90 \leq a \leq 1$ and $0.001 \leq b \leq 0.1$); $QO_2$; $QS_2$; $LiQS_2$; $V_2O_5$; $LiV_2O_5$; $LiNiVO_2$; $LiNiVO_4$; $Li_{(3-f)}J_2(PO_4)_3$ (where $0 \leq f \leq 2$); $Li_{(3-f)}Fe_2(PO_4)_3$ (where $0 \leq f \leq 2$); and $LiFePO_4$.

In formulae above, A may include Ni, Co, Mn, or a combination thereof; B' may include aluminum (Al), Ni, Co, Mn, chromium (Cr), iron (Fe), magnesium (Mg), strontium (Sr), vanadium (V), a rare earth element, or a combination thereof; D' may include oxygen (O), fluorine (F), sulfur (S), phosphorus (P), or a combination thereof; E may include Co, Mn, or a combination thereof; F' may include F, S, P, or a combination thereof; G may include Al, Cr, Mn, Fe, Mg, lanthanum (La), cerium (Ce), Sr, V, or a combination thereof; Q may include titanium (Ti), molybdenum (Mo), Mn, or a combination thereof; I' may include Cr, V, Fe, Sc, yttrium (Y), or a combination thereof; and J may include V, Cr, Mn, Co, Ni, Cu, or a combination thereof.

For example, the compound may have a coating layer on a surface thereof, or the compound and a compound having a coating layer may be used as a mixture. The coating layer may include a compound of a coating element, such as an oxide of a coating element, a hydroxide of a coating element, an oxyhydroxide of a coating element, an oxycarbonate of a coating element, or a hydroxyl carbonate of a coating element. The compound forming the coating layer may be amorphous or crystalline. The coating element included in the coating layer may include Mg, Al, Co, potassium (K), sodium (Na), calcium (Ca), silicon (Si), Ti, V, tin (Sn), germanium (Ge), gallium (Ga), boron (B), arsenic (As), zirconium (Zr), or a combination thereof. A formation process (e.g., spray coating or dip-coating) of the coating layer may be any suitable coating method that does not adversely affect properties of the cathode active material by using the elements above, and the coating method may be a method used by those of skill in the art, the details of which can be determined without undue experimentation. Accordingly, further description of the coating method will be omitted.

Examples of the electrically conductive material include a carbon fiber or a carbon nanotube, such as carbon black, graphite particles, natural graphite, artificial graphite, acetylene black, or Ketjen black; metal powder, metal fiber, or metal tube, such as Cu, Ni, Al, or silver (Ag); and an electrically conductive polymer, such as a polyphenylene derivative, but are not limited thereto. Any material suitable as a conductive material in the art may be used.

Examples of the binder include a vinylidene fluoride/hexafluoropropylene copolymer, polyvinylidene fluoride, polyacrylonitrile, polymethyl methacrylate, polytetrafluoroethylene (PTFE), a mixture of the above-described polymers, or a styrene-butadiene rubber-based polymer. Examples of the solvent include N-methylpyrrolidone (NMP), acetone, or water, but are not limited thereto. Any material suitable as a binder and a solvent in the art may be used.

If desired, a plasticizer may be further added to the cathode slurry composition to thereby form a pore inside an electrode plate.

Amounts of the cathode active material, the electrically conductive agent, the binder, and the solvent are similar to those used in the art of the lithium secondary battery. Depending on the use and features of the lithium secondary battery, at least one of the electrically conductive agent, the binder, and the solvent may be omitted.

The cathode current collector may be prepared to have a thickness in a range of about 1 μm to about 1000 μm, about 3 μm to about 500 μm, or about 10 μm to about 200 μm. The cathode current collector may be made of any suitable material available in the art without particular limitation so long as the material has suitable electrical conductivity and does not causing an undesirable change in a battery. For example, the cathode current collector may be made of copper, stainless steel, aluminum, nickel, titanium, sintered carbon, copper, or stainless steel surface treated with carbon, nickel, titanium, or silver, or an aluminum-cadmium alloy. In addition, fine uneven structures may be formed on a surface of the cathode current collector to enhance a binding strength of the cathode current collector to the cathode active material. The cathode current collector may be used in various forms, such as a film, a sheet, a foil, a net, a porous body, a foaming body, or a non-woven fabric.

The cathode may have mixing density of at least 1 grams per cubic centimeter (g/cc), at least 2 g/cc, or at least 3 g/cc.

An anode may be prepared as follows. The anode may be prepared in the same manner as in the preparation of the cathode, except that an anode active material is used instead of the cathode active material. In addition, in the anode slurry composition, the electrically conductive agent, the binder, and the solvent may be the same as those defined in connection with the preparation of the cathode.

For example, the anode active material, the binder, and the solvent may be mixed together to prepare an anode slurry composition. Here, the conductive agent may be optionally mixed therewith. The composition for forming the anode slurry may be directly coated on an anode current collector, thereby preparing an anode plate. Alternatively, an anode plate may be prepared by casting the anode slurry composition on a separate support to form an anode active material film, which may then be separated from the support and laminated on an anode current collector.

As the anode active material, the above-described electrode active material may be used. In addition, the anode active material may include, in addition to the above-described electrode active material, any material suitable as the anode active material used in the art of the lithium secondary battery. For example, the anode active material may include at least one selected from a lithium metal, a metal alloyable with lithium, a transition metal oxide, a non-transition metal oxide, and a carbonaceous material.

For example, the metal alloyable with lithium may be Si, Sn, Al, Ge, lead (Pb), bismuth (Bi), antimony (Sb), a Si—Y' alloy (where Y' is an alkali metal, an alkaline earth metal, a Group 13 element, a Group 14 element, a transition metal, a rare earth element, or a combination thereof, and is not Si), or a Sn—Y" alloy (where Y" is an alkali metal, an alkaline earth metal, a Group 13 element, a Group 14 element, a transition metal, a rare earth element, or a combination thereof, and is not Sn). The elements Y' and Y" may each independently include Mg, Ca, Sr, barium (Ba), radium (Ra), scandium (Sc), Y, Ti, Zr, hafnium (Hf), rutherfordium (Rf), V, niobium (Nb), tantalum (Ta), dubnium (Db), Cr, Mo, tungsten (W), seaborgium (Sg), technetium (Tc), rhenium (Re), bohrium (Bh), Fe, Pb, ruthenium (Ru), osmium (Os), hassium (Hs), rhodium (Rh), iridium (Ir), palladium (Pd), platinum (Pt), Cu, Ag, gold (Au), zinc (Zn), cadmium (Cd), B, Al, Ga, Sn, indium (In), Ge, P, As, Sb, Bi, S, selenium (Se), tellurium (Te), polonium (Po), or a combination thereof.

For example, the transition metal oxide may include a lithium titanate oxide, a vanadium oxide, or a lithium vanadium oxide.

For example, the non-transition metal oxide may include $SnO_2$ or $SiO_x$ (where $0<x<2$).

The carbonaceous material may include crystalline carbon, amorphous carbon, or a combination thereof. Examples of the crystalline carbon include natural graphite or artificial graphite that is in an amorphous, plate, flake, spherical, or fibrous form. Examples of the amorphous carbon include soft carbon (e.g., carbon sintered at low temperatures), hard carbon, meso-phase pitch carbide, or a sintered coke.

Amounts of the anode active material, the electrically conductive agent, the binder, and the solvent are similar to those commercially used in the art of lithium secondary battery and can be determined by one of skill in the art without undue experimentation.

The anode current collector may be prepared to have a thickness in a range of about 1 μm to about 1000 μm, about 3 μm to about 500 μm, or about 10 μm to about 300 μm. The anode current collector may be made of any suitable material available in the art without particular limitation so long as the material has suitable electrical conductivity and does not causing an undesirable change in a battery. For example, the anode current collector may be made of copper, stainless steel, aluminum, nickel, titanium, sintered carbon, copper, or stainless steel surface treated with carbon, nickel, titanium, or silver, or an aluminum-cadmium alloy. In addition, fine uneven structures may be formed on a surface of the anode current collector to enhance a binding strength of the anode current collector to the anode active material. The anode current collector may be used in various forms, such as a film, a sheet, a foil, a net, a porous body, a foaming body, or a non-woven fabric.

The cathode and the anode may be separated from each other by a separator. The separator used herein may be any suitable separator used in the art of the lithium secondary battery. In particular, a separator with low resistance against ionic movement of an electrolyte and an improved electrolyte-wetting capacity may be used. For example, the separator may be selected from glass fiber, polyester, polyethylene, polypropylene, polytetrafluoroethylene (PTFE), or a combination thereof, and may be in the form of a woven or a non-woven fabric. The separator used herein may have a pore diameter in a range of about 0.01 μm to about 50 μm, about 0.01 μm to about 10 μm, or about 1 μm to about 5 μm, and a thickness in a range of about 1 μm to about 500 μm, about 5 μm to about 300 μm, or about 10 μm to about 100 μm.

A non-aqueous electrolyte containing a lithium salt includes a non-aqueous liquid electrolyte and a lithium salt, and the non-aqueous electrolyte may include a non-aqueous liquid electrolyte, an organic solid electrolyte, or an inorganic solid electrolyte.

The non-aqueous electrolyte may include, for example, an aprotic organic solvent, such as N-methyl-2-pyrrolidone, propylene carbonate, ethylene carbonate, butylene carbonate, dimethyl carbonate, diethyl carbonate, γ-butyrolactone, 1,2-dimethoxy ethane, tetrahydrofuran, 2-methyl tetrahydrofuran, dimethyl sulfoxide, 1,3-dioxolane, formamide, dimethylformamide, dioxolane, acetonitrile, nitromethane, methyl formate, methyl acetate, phosphoric acid triester, trimethoxymethane, a dioxolane derivative, sulfolane, methyl sulfolane, 1,3-dimethyl-2-imidazolidinone, a propylene carbonate derivative, a tetrahydrofuran derivative, ether, methyl propionate, or ethyl propionate.

The organic solid electrolyte may include, for example, a polyethylene derivative, a polyethylene oxide derivative, a polypropylene oxide derivative, a phosphoric acid ester polymer, poly(L-lysine), polyester sulfide, polyvinyl alcohol, polyvinylidene fluoride, or a polymer including an ionic dissociable group.

The inorganic solid electrolyte may include, for example, nitride, halide, sulfate, or silicate of lithium (Li), such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, or $Li_3PO_4$—$Li_2S$—$SiS_2$.

The lithium salt may include any suitable lithium salt used in the art of the lithium secondary battery, and examples of the lithium salt include $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborate, low aliphatic carboxylic acid lithium salt, 4 phenyl boronic acid lithium salt, lithium imide, or a combination thereof.

The lithium secondary battery may be a lithium ion secondary battery, a lithium ion polymer secondary battery, or a lithium polymer secondary battery, depending on the separator and the electrolyte used. The lithium secondary battery may be a cylindrical battery, a rectangular-shaped battery, a coin-shaped battery, or a pouch-shaped battery, depending on the shape thereof. The lithium secondary battery may be a bulk-type battery or a thin film-type battery, depending on the size thereof.

Methods of preparing lithium secondary batteries are known in the art, details of which may be determined by one of skill in the art without undue experimentation, and thus further description of the methods will be omitted for clarity.

Figure 3:
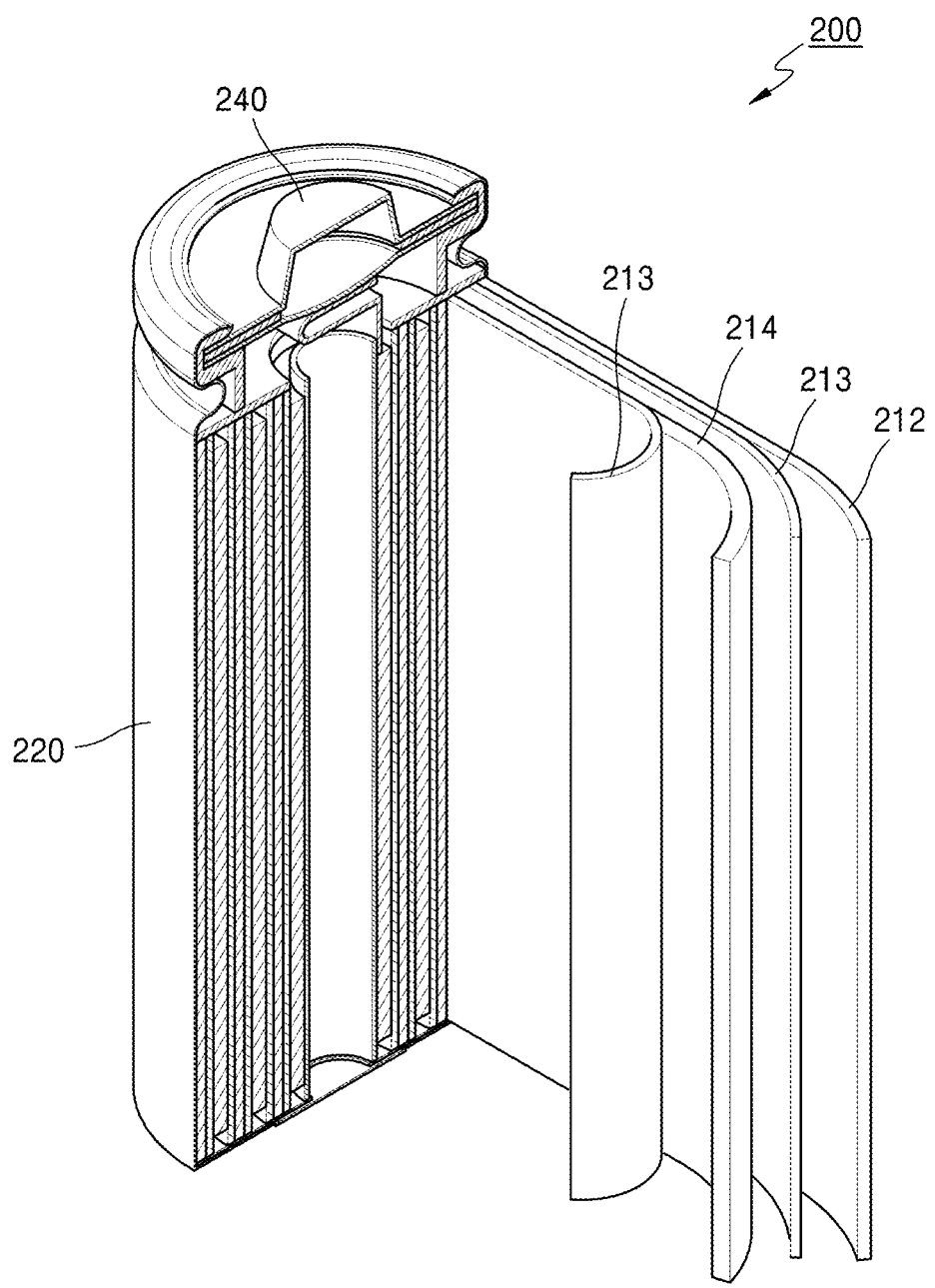
FIG. 3 is a schematic diagram of a structure of a lithium secondary battery according to yet another embodiment.

FIG. 3 is a schematic diagram of a structure of a lithium secondary battery 200 according to an embodiment.

As shown in FIG. 3, the lithium secondary battery 200 includes a cathode 214, a separator 213, and an anode 212. The cathode 214, the separator 213, and the anode 212 described above are wound or folded to be accommodated into a battery container 220. Then, an organic electrolyte is introduced into the battery container 220, and sealed with a sealing element 240, thereby completing the preparation of the lithium battery 200. The battery container 220 may be cylindrical, rectangular-shaped, or thin film-shaped. For example, the lithium battery 200 may be a large thin film battery. The lithium battery 200 may be, for example, a lithium ion secondary battery.

The separator 213 may be disposed between the cathode 214 and the anode 212, thereby forming an electrode assembly. Once the electrode assembly is laminated in a bicell structure, an organic electrolyte may be impregnated thereinto, and the resulting product disposed into a pouch and sealed, thereby completing the preparation of a lithium ion polymer secondary battery.

Furthermore, a plurality of electrode assemblies may be laminated to form a battery pack, and thus the battery pack may be used in a devices to provide high capacity and high power. For example, the battery pack may be used in a notebook, a smartphone, an electrically-driven tool, or an electric vehicle.

In addition, the lithium secondary battery may have improved storage stability, lifespan characteristics, and high efficiency characteristics at high temperatures, and thus may be useful in an electric vehicle (EV). For example, the lithium secondary battery may be applied to a hybrid electric vehicle, such as a plug-in hybrid electric vehicle (PHEV).

In the lithium secondary battery according to an embodiment, the above-described electrode active material may be used as the anode active material. However, in a lithium sulfur secondary battery according to an embodiment, the above-described electrode active material may be used as the cathode active material.

A method of preparing the electrode active material according to another aspect may include: spray-drying a slurry including a first carbonaceous material, a silicon material, and a second carbonaceous material to form a dried powder; and heat treating the dried powder in an inert atmosphere to prepare a secondary particle-type electrode active material, wherein the secondary particle-type electrode active material includes at least one pore; and a shell surrounding the at least one pore, wherein the shell includes a first layer and a second layer, the first layer including the first carbonaceous material, and the second layer including a composite and disposed on the first layer, wherein the composite includes a silicon material and the second carbonaceous material.

First, the slurry including the first carbonaceous material, the silicon-based material, and the second carbonaceous material is subjected to a spray-drying process, so as to obtain dried powder of the slurry. Here, the slurry may be obtained by simultaneously adding the first carbonaceous material, the silicon-based material, and the second carbonaceous material to a solvent, and by stirring the mixed solution. The slurry may further include a binder. The binder may include an organic binder, an aqueous binder, or a combination thereof. The organic binder or the aqueous binder may be the same as those defined above, and thus the description thereof will be omitted.

Alternatively, a first mixed slurry may be obtained by adding the first carbonaceous material, the binder, and the second carbonaceous material to a solvent, and by stirring the mixed solution. Here, the stirring may be performed for a sufficient time (e.g., about 1 to about 3 hours) according to a first ultrasonic stirring process and/or a first mechanical stirring process, thereby obtaining the first mixed slurry.

Then, the silicon-based material (e.g., silicon powder alone) may be added to the first mixed slurry, and additionally stirred for about 1 to about 3 hours according to a second ultrasonic stirring process and/or a second mechanical stirring process, thereby obtaining the second mixed slurry.

The amount of solid content in the slurry (e.g., the second mixed slurry) may be in a range of about 1 weight percent (wt %) to about 40 wt %, for example, about 2 wt % to about 35 wt %, about 3 wt % to about 30 wt %, about 4 wt % to about 20 wt %, or about 5 wt % to about 15 wt %, based on the total weight of the first mixed slurry and the second mixed slurry. The term "amount of solid content" as used herein may refer to the amount of a solid material in terms of percentage with respect to the total weight of the slurry including the first carbonaceous material, the silicon-based material, the second carbonaceous material, the binder, and the solvent, wherein the solid material is a solid material being left in the slurry after the solvent is removed therefrom.

The amount of solid content in the slurry (e.g., the second mixed slurry) may be adjusted within the ranges above, so as to prepare a slurry having desired viscosity. In this regard, a pore may be produced in the desired size in the secondary particle-type electrode active material. Accordingly, an electrode and a secondary battery that include the secondary particle-type electrode active material may have improved coulombic efficiency and improved charge and discharge characteristics, such as lifespan characteristics.

A ratio of the amounts of the first carbonaceous material to the silicon-based material to the second carbonaceous material may be in a range of (about 40 to 60 to about 20) to (about 40 to about 5 to about 20). For example, the ratio of the amounts of the first carbonaceous material to the silicon-based material to the second carbonaceous material may be in a range of (about 50 to about 60 to about 25) to (about 35 to about 5 to about 15). For example, the ratio of the amounts of the first carbonaceous material to the silicon-based material to the second carbonaceous material may be in a range of (about 60 to about 25 to about 5) to (about 50 to about 35 to about 5), or (about 60 to about 25 to about 15) to (about 50 to about 35 to about 15).

The ratio of the amount of the first carbonaceous material to the silicon-based material to the second carbonaceous material may be adjusted within the ranges of the weight ratios above, so as to prepare a slurry having desired viscosity for preparing the secondary particle-type electrode active material. In this regard, a pore may be produced in the desired size in the secondary particle-type electrode active material. Accordingly, an electrode and a secondary battery that includes the secondary particle-type electrode active material may have improved coulombic efficiency and improved charge and discharge characteristics, such as lifespan characteristics.

The amount of the binder may be in a range of about 1 wt % to about 50 wt %, based on the total weights of the slurry. For example, the amount of the binder may be in a range of about 1 wt % to about 40 wt %, based on the total weight of the slurry. For example, the amount of the binder may be in a range of about 1 wt % to about 30 wt %, based on the total weight of the slurry. For example, the amount of the binder may be in a range of about 1 wt % to about 20 wt %, based on the total weight of the slurry. The amount of the binder may be adjusted within the ranges above, so as to prepare a slurry having desired viscosity. In this regard, a pore may be produced in the desired size in the secondary particle-type electrode active material. Accordingly, an electrode and a secondary battery that include the secondary particle-type electrode active material may have improved charge and discharge characteristics, such as coulombic efficiency and lifespan characteristics.

The slurry (e.g., the second mixed slurry) may be spray-dried to obtain dried powder thereof. A spray dryer used herein may be any suitable spray dryer available in the art, and for example, may be an ultrasonic spray dryer, an air nozzle spray dryer, an ultrasonic nozzle spray dryer, a filter expansion aerosol generator, or an electrostatic spray dryer, but the spray dryer is not limited thereto.

The spray-drying the slurry may include a process of spray-drying the slurry (e.g., the second mixed slurry) at a temperature of about 300° C. or less. Here, the slurry (e.g., the second mixed slurry) may be spray-dried through an air cyclotron rotating at a high speed in a spray chamber at a temperature in a range of about 30° C. to about 300° C., about 50° C. to about 300° C., or about 100° C. to about 200° C., thereby spray-drying the slurry to form the dried powder.

The spray-drying of the slurry may include selecting an amount of a solid content in the slurry, a ratio of amounts of the first carbonaceous material to the silicon-based material to the second carbonaceous material, the amount of the binder, or the amounts of a combination thereof, to select a pore size of the dried powder.

Next, the obtained dried powder of the slurry may be heat-treated in the same chamber or in a different chamber in an inert gas atmosphere, thereby preparing the above-described secondary particle-type electrode active material. For example, the dried powder of the slurry may undergo heat-treating in the same chamber in an inert gas atmosphere, thereby preparing the above-described secondary particle-type electrode active material. That is, the secondary particle-type electrode active material may be prepared through a single process.

The preparing of the secondary particle-type electrode active material may include a process of heat-treating the dried powder in a nitrogen atmosphere at a temperature in a range of about 300° C. to about 1,500° C., about 500° C. to about 1,300° C., or about 700° C. to about 1000° C. For example, the process of heat-treating the dried powder may be carried out in a nitrogen atmosphere at a temperature in a range of about 600° C. to about 900° C. for about 1 to about 5 hours.

The slurry (e.g., the second mixed slurry) may have a flow velocity in a range of about 0.1 milliliters per minute (mL/min) to about 300 mL/min, about 1 mL/min to about 100 mL/min, or about 5 mL/min to about 50 mL/min.

However, to obtain the solid content in the slurry (e.g., the second mixed slurry), the spray-drying conditions may be appropriately adjusted by controlling flux and flow velocity of the slurry (e.g., the second mixed slurry), sintering temperatures, residence time in the spray chamber, internal pressures, or the like.

The prepared secondary particle-type electrode active material may be dried-cooled in a furnace.

Hereinafter, the present disclosure will be described in further detail with reference to the following examples. These examples are for illustrative purposes only and are not intended to limit the scope of the present disclosure.

EXAMPLES

Example 1: Preparation of an Electrode Active Material

A multi-walled carbon nanotube (MWCNT) (manufactured by CNT Co., Ltd, and having purity of 97% or greater, an average diameter of 20 nm, and an average length in a range of about 1 μm to about 25 μm), graphite powder (SGP-1, from SEC Carbon Ltd and having an average particle diameter of about 4 μm), and polyvinyl alcohol (PVA) (from Sigma-Aldrich and having a weight average molecular weight (Mw) in a range of about 31,000 Daltons to about 51,000 Daltons) were added to 100 mL of deionized water. The mixed solution was subjected to a first ultrasonic dispersion for about 1 hour, thereby obtaining a first mixed slurry.

Silicon powder (having an average particle diameter of about 150 nm) was added to the first mixed slurry, followed by a second ultrasonic dispersion for about 1 hour, thereby obtaining a second mixed slurry. Here, a weight ratio of the silicon powder:MWCNT:graphite powder:PVA included in the second mixed slurry was 25:5:60:20. The amount of solid content in the second mixed slurry was about 8 wt %, based on the total weights of the second mixed slurry.

The second mixed slurry was spray-dried with nitrogen gas sprayed at 60 liters/minutes by using a spray dryer (Mini Spray Dryer B-290 from BUCHI, a two-fluid nozzle type) at a temperature of 220° C., thereby obtaining dried powder of the second mixed slurry.

The obtained dried powder was subjected to a sintering process at a temperature of 750° C. for 12 hours in a nitrogen gas atmosphere, thereby preparing a secondary particle-type electrode active material

Example 2: Preparation of an Electrode Active Material

A secondary particle-type electrode active material was prepared in the same manner as in Example 1, except that the weight ratio of the silicon powder:MWCNT:graphite powder:PVA included in the second mixed slurry was 35:5:50:20 instead of 25:5:60:20.

Example 3: Preparation of an Electrode Active Material

A secondary particle-type electrode active material was prepared in the same manner as in Example 1, except that the weight ratio of the silicon powder:MWCNT:graphite powder:PVA included in the second mixed slurry was 35:5:50:10 instead of 25:5:60:20.

Example 4: Preparation of an Electrode Active Material

A secondary particle-type electrode active material was prepared in the same manner as in Example 1, except that the weight ratio of the silicon powder:MWCNT:graphite powder:PVA included in the second mixed slurry was 25:15:60:20 instead of 25:5:60:20.

Example 5: Preparation of an Electrode Active Material

A secondary particle-type electrode active material was prepared in the same manner as in Example 1, except that the weight ratio of the silicon powder:MWCNT:graphite powder:PVA included in the second mixed slurry was 35:15:50:20 instead of 25:5:60:20.

Comparative Example 1: Preparation of an Electrode Active Material

An MWCNT (from CNT Co., Ltd, and having purity of 97% or greater, an average diameter of 20 nm, and an average length in a range of about 1 μm to about 25 μm) and PVA (from Sigma-Aldrich and having a weight average molecular weight Mw in a range of about 31,000 Daltons to about 51,000 Daltons) were added to 100 mL of deionized water. The mixed solution was subjected to a first ultrasonic dispersion for about 1 hour, thereby obtaining a first mixed slurry.

Silicon powder (having an average particle diameter of about 150 nm) was added to the first mixed slurry, additionally followed by a second ultrasonic dispersion for about 1 hour, thereby obtaining a second mixed slurry. Here, a weight ratio of the silicon powder:MWCNT:PVA included in the second mixed slurry was 80:10:10. An amount of solid content in the second mixed slurry was about 8 weight % based on the total weights of the second mixed slurry.

The second mixed slurry was spray-dried with nitrogen gas sprayed in 60 liters/minutes by using a spray dryer (Mini Spray Dryer B-290 from BUCHI, a two-fluid nozzle type) at a temperature of 220° C., thereby obtaining dried powder of the second mixed slurry.

The obtained dried powder was subjected to a sintering process at a temperature of 750° C. for 12 hours in a nitrogen gas atmosphere, thereby preparing a secondary particle-type electrode active material.

Example 6: Preparation of a Lithium Secondary Battery (i.e., a Coin-Type Cell)

Powders of the secondary particle-type electrode active material of Example 1 were uniformly mixed with a polyacrylate substituted with lithium binder (LiPAA available from Sigma-Aldrich) and carbon black (Lion specialty chemicals, KB, KB600JD), thereby preparing an anode active material slurry in which a mixing ratio of solid content in the powders of the electrode active material of Example 1:LiPAA:carbon black was 91:8:1.

A copper foil having a thickness of 10 μm was coated with the anode active material slurry to a thickness of 30 μm using a bar coating. The coated copper foil was dried, and then, additionally vacuum-dried at a temperature of 120° C., thereby preparing an anode electrode plate. The anode electrode plate was roll-pressed, thereby preparing a sheet-shaped anode for a coin-type cell. Here, the anode had a capacity of about 2.5 milliAmpere hours per cubic centimeter (mAh/cm$^3$).

The anode was used to prepare a coin-type half cell (CR2032 type) with a diameter of about 12 millimeters (mm). When preparing the coin-type half cell (CR2032 type), lithium metal was used as a counter electrode, and a lithium salt, in which 1.0 M LiPF$_6$ was dissolved in a mixed solvent of ethylene carbonate (EC), diethyl carbonate (DEC), and fluoroethylene carbonate (FEC) (at volume ratio of 2:6:2), was used as an electrolyte.

Examples 7 to 10: Preparation of Lithium Secondary Batteries (i.e., Coin-Type Cells)

Coin-type half cells were prepared in the same manner as in Example 6, except that in preparation of an anode active material slurry, powders of the secondary particle-type electrode active materials of Examples 2 to 5 were each used instead of the powders of the electrode active material of Example 1.

Comparative Example 2: Preparation of a Lithium Secondary Battery (i.e., a Coin-Type Cell)

A coin-type half cell (CR2032 type) was prepared in the same manner as in Example 6, except that in preparation of an anode active material slurry, powder of the electrode active material of Comparative Example 1 was used instead of powder of the electrode active material of Example 1.

Analysis Example 1: SEM Analysis on a Morphology and a Cross-Section of an Electrode Active Material The secondary particle-type electrode active materials of Examples 1 to 4 and Comparative Example 1 were each subjected to SEM analysis. The SEM analysis was performed by using a JSM-7600F from JEOL. The secondary particle-type electrode active materials were observed in terms of a morphology and a cross-section thereof, and the observation results are shown in FIGS. 4A to 4E.

Referring to FIGS. 4A to 4D, it was confirmed that the secondary particle-type electrode active materials of Examples 1 to 4 each included at least one pore and at least two layers of a shell surrounding the at least one pore.

In addition, it was confirmed that the first layer and the second layer included in the shell of each of the secondary particle-type electrode active materials of Examples 1 to 4 each had a thickness in a range of about 1 to about 10 μm.

Figure 4A:
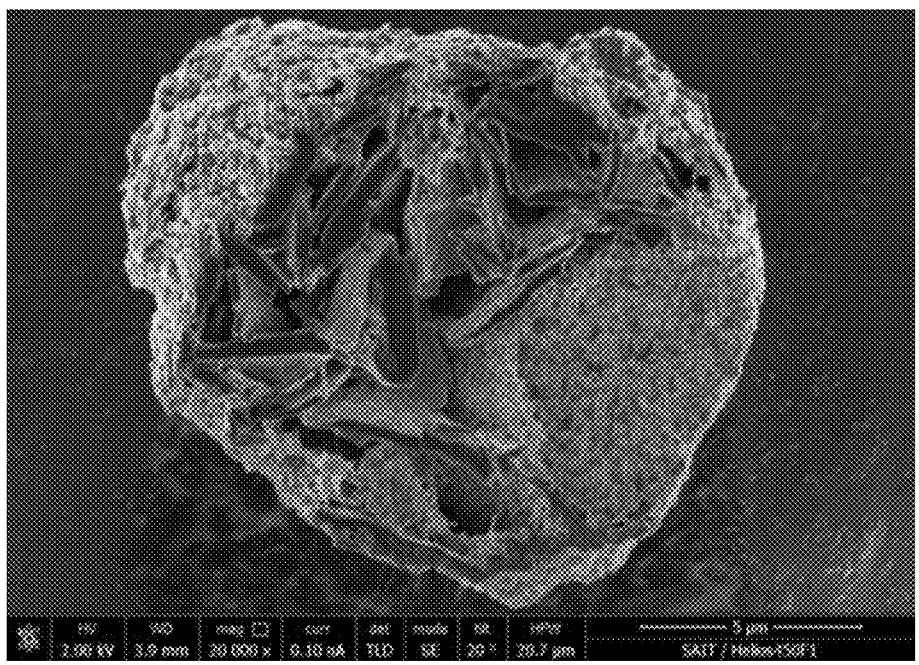
FIGS. 4A to 4E are each a scanning electron microscopy (SEM) image showing a cross-sectional view of a morphology of secondary particle-type electrode active materials according to Examples 1 to 4 and Comparative Example 1, respectively.
Figure 4B:
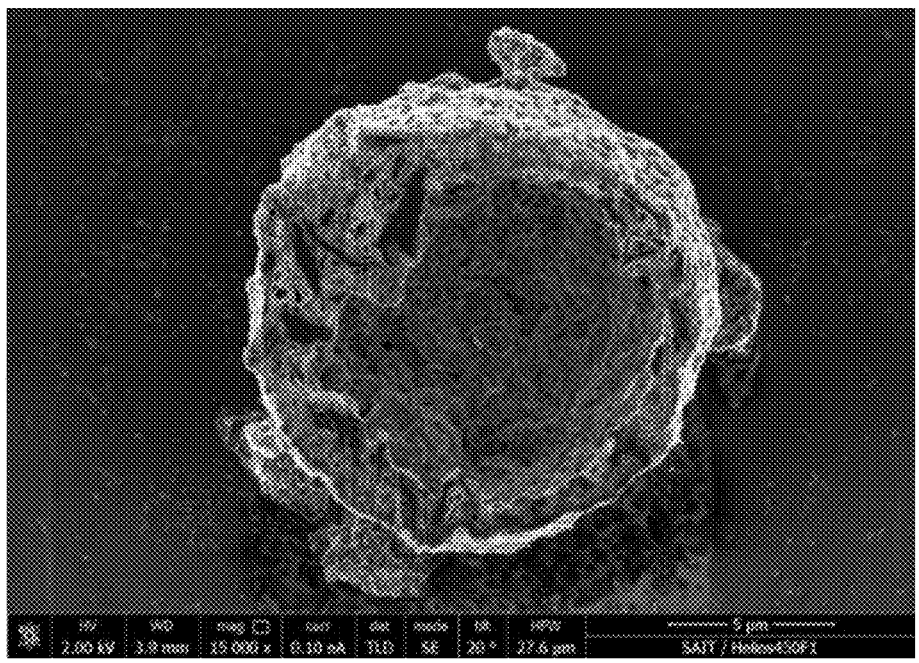
Figure 4C:
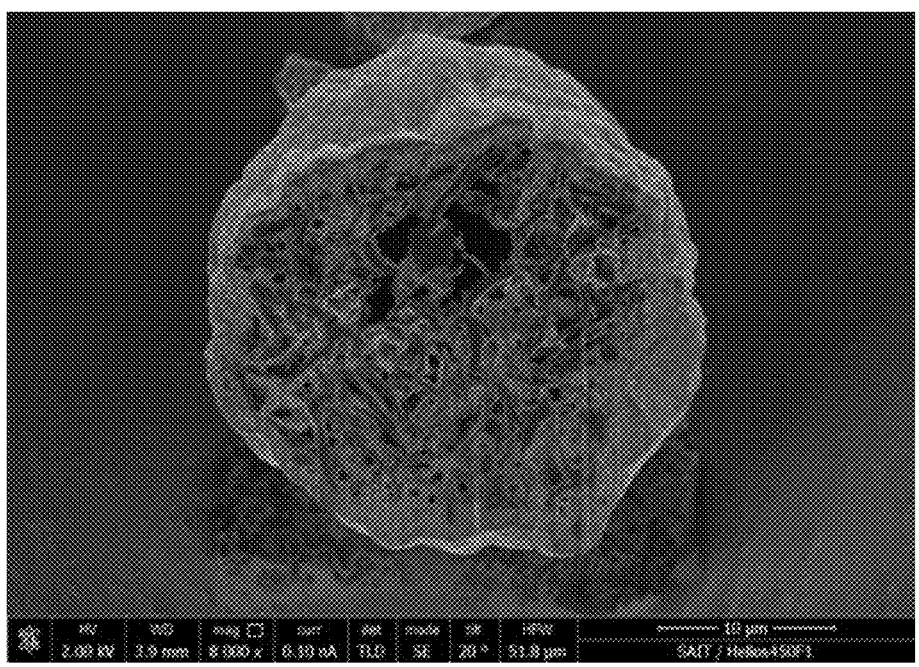
Figure 4D:
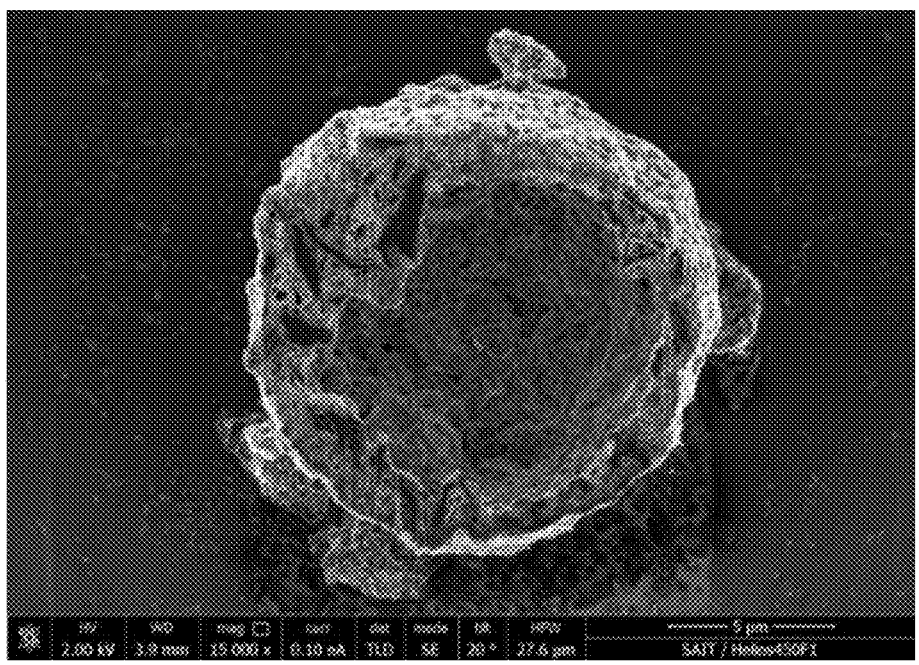
Figure 4E:
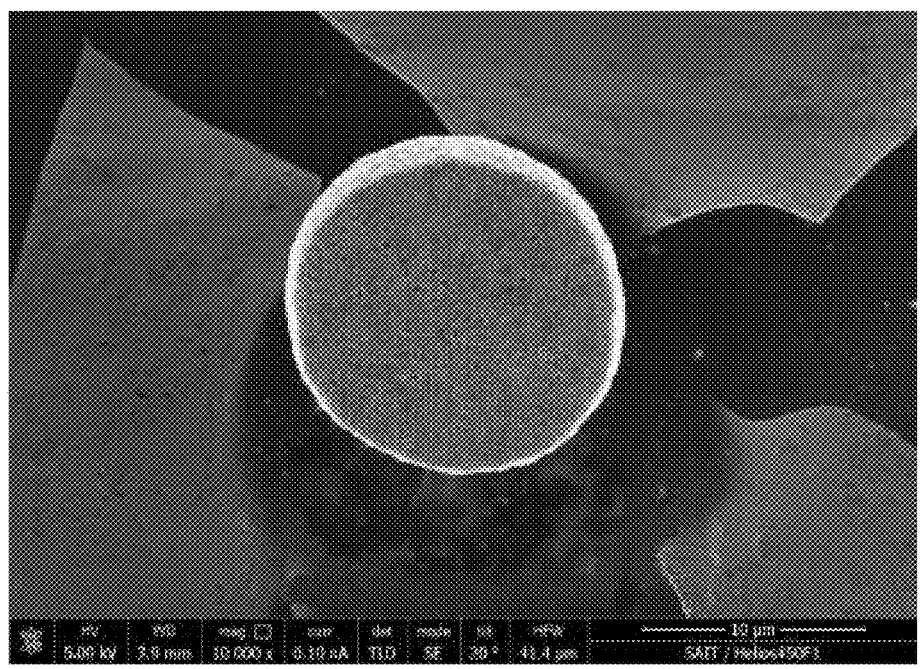

Referring to FIG. 4E, it was confirmed that the presence of a pore or a shell surrounding the pore was not identified in the secondary particle-type electrode active material of Comparative Example 1.

Analysis Example 2: Energy Dispersive Spectroscopy (EDS) Image

Figure 5A:
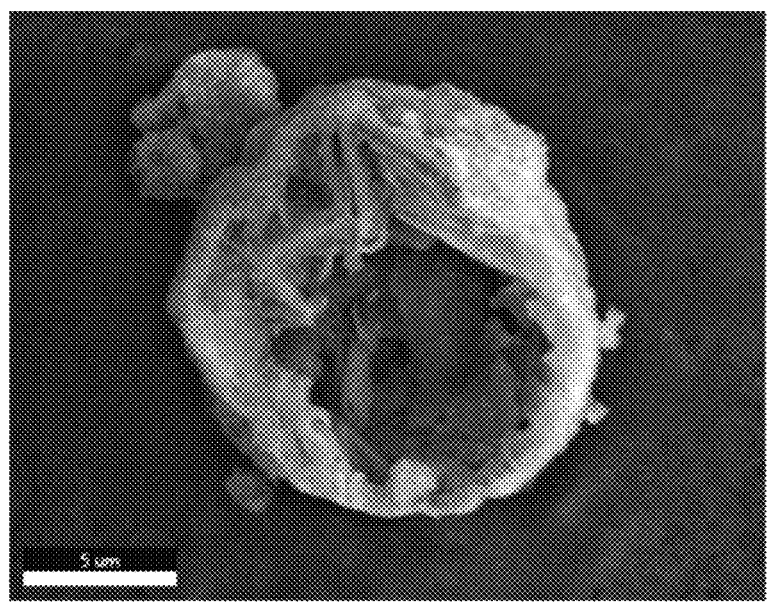
Figure 5B:
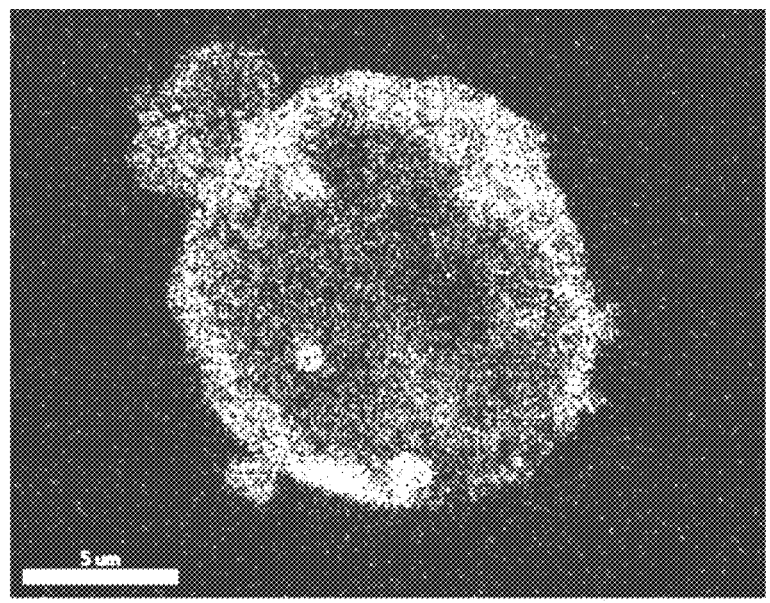
Figure 5C:
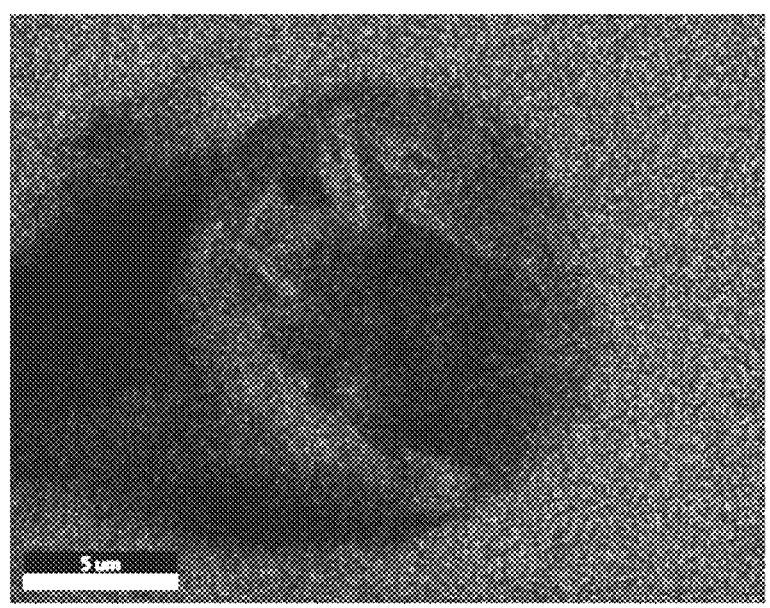

The entire secondary particle-type electrode active material of Example 4 and the silicon element and the carbon element included in the same secondary particle-type electrode active material were each subjected to EDS analysis, and the analyzed results are shown in FIGS. 5A to 5C. Here, the EDS analysis was performed by using a S-4700 from Hitachi.

Referring to FIGS. 5A to 5C, on the basis of FIG. 5A, which is an image of the entire secondary particle-type electrode active material of Example 4, it was confirmed that the silicon element and the carbon element indicated in dots in FIGS. 5B and 5C were arranged on the shell of the secondary particle-type electrode active material of Example 4 and that the distribution of the silicon element and the carbon element was mostly uniform.

Evaluation Example 1: Charge and Discharge Test on Coulombic Efficiency and Lifespan Characteristics The lithium secondary batteries of Example 8 and Comparative Example 2 were each charged with a constant current of 0.1 C rate at room temperature (25° C.) until a voltage of the lithium batteries reached about 0.01 V (vs. Li), and then, were each discharged with a constant current of 0.1 C rate until the voltage reached a cut-off voltage of about 1.5 V. Here, the charge capacity and discharge capacity of the lithium secondary batteries (i.e., charge capacity and discharge capacity at the 1$^{st}$ cycle) were measured.

Subsequently, the lithium secondary batteries were each charged with a constant current of 0.2 C rate as described above, and then, were each discharged with a constant current of 0.2 C rate until the voltage reached 1.0 V.

Subsequently, the lithium secondary batteries were each charged with a constant current of 1 C rate as described above, and then, were each discharged with a constant current of 1 C rate until the voltage reached 1.0 V. This cycle of charging and discharging was repeated 100 times, and the discharge capacity of each of the lithium secondary batteries was measured at the 100$^{th}$ cycle. Regarding coulombic efficiencies of the lithium secondary batteries, the discharge capacity measured at each cycle was divided by the charge capacity measured at each cycle, and then, the division result was multiplied by 100. The calculated value was used to evaluate coulombic efficiencies of the lithium secondary batteries, whereas a value calculated according to Equation 1 below was used to evaluate lifespan characteristics of the lithium secondary batteries. Some of the calculated results are shown in Table 1 and FIGS. 6 and 7.

Capacity retention rate [%]=[Discharge capacity at a 100$^{th}$ cycle/Discharge capacity at a 1$^{st}$ cycle]× 100%        Equation 1

TABLE 1

|  | Capacity retention rate (%) |
| --- | --- |
| Example 8 | 88 |
| Comparative Example 2 | 80 |

Figure 6:
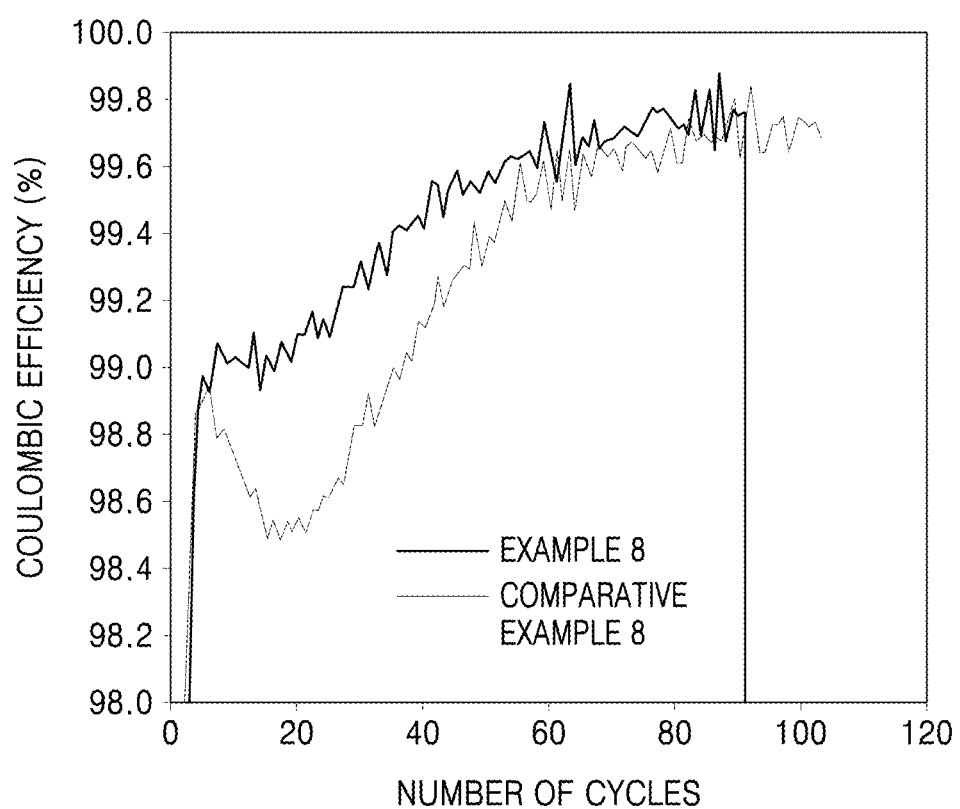
FIG. 6 is a graph of Coulombic efficiency (percent, %) versus number of cycles, showing coulombic efficiencies of lithium secondary batteries according to Example 8 and Comparative Example 2.

Referring to FIG. 6, it was confirmed that the coulombic efficiency of the lithium secondary battery of Comparative Example 2 was significantly decreased when reaching close to the 20$^{th}$ cycle, and then, was significantly increased until reaching the 40$^{th}$ cycle. Meanwhile, the coulombic efficiency of the lithium secondary battery of Example 8 was gradually increased until the 100$^{th}$ cycle rather than being rapidly increased or decreased.

Accordingly, it was confirmed that the lithium secondary battery of Example 8 barely underwent loss of capacity at the initial cycle.

Figure 7:
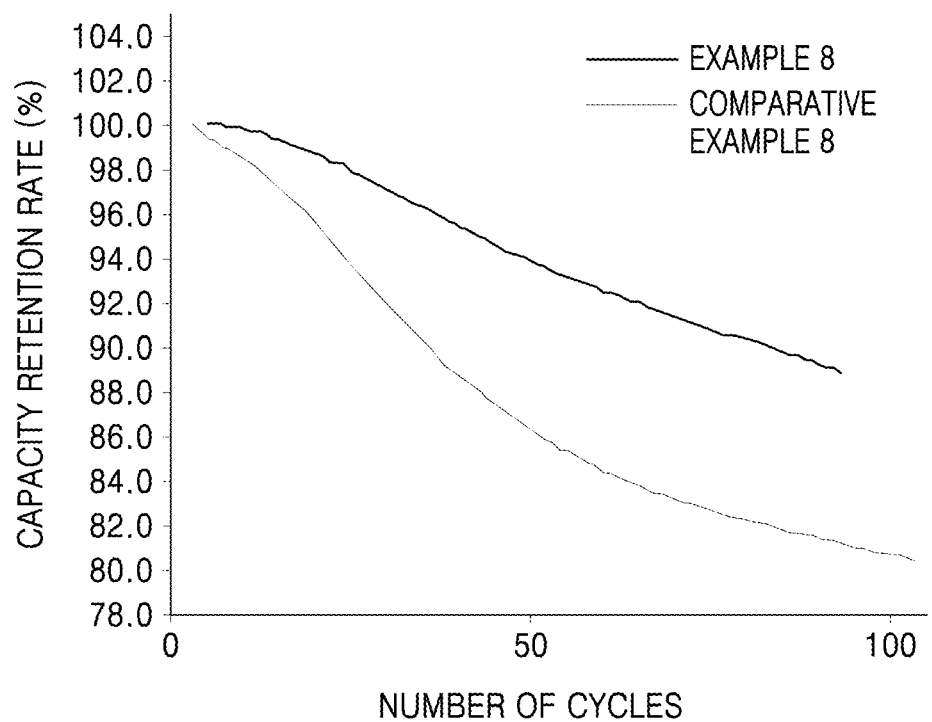
FIG. 7 is a graph of capacity retention rate (percent, %) versus number of cycles of lithium secondary batteries according to Example 8 and Comparative Example 2.

In addition, referring to Table 1 and FIG. 7, it was confirmed that the lithium secondary battery of Example 8 exhibited a capacity retention rate that was improved by about 10%, compared to that of the lithium secondary battery of Comparative Example 2.

According to the one or more embodiments, an electrode active material is a self-assembly product secondary particle-type electrode active material in which a size of a pore in the secondary particle-type electrode active material is adjusted, and thus an electrode and a secondary battery that include the secondary particle-type electrode active material may accordingly have improved charge and discharge characteristics. In addition, according the one or more embodiments, a method of preparing the secondary particle-type electrode active material is simple and easy.

It should be understood that embodiments described herein should be considered in a descriptive sense only and not for purposes of limitation. Descriptions of features or aspects within each embodiment should be considered as available for other similar features or aspects in other embodiments.

While an embodiment has been described with reference to the figures, it will be understood by those of ordinary skill in the art that various changes in form and details may be made therein without departing from the spirit and scope as defined by the following claims.

What is claimed is:

1. A secondary particle-type electrode active material comprising:
   at least one pore; and
   a shell surrounding the at least one pore,
   wherein the shell comprises a first layer and a second layer,
     the first layer comprising a first carbonaceous material, and
     the second layer comprising a composite and disposed on the first layer,
     wherein the composite comprises a silicon material and a second carbonaceous material, and
     wherein the second carbonaceous material comprises a carbon nanotube.

2. The secondary particle-type electrode active material of claim 1, wherein the first carbonaceous material has a bulk density which is greater than a bulk density of the second carbonaceous material.

3. The secondary particle-type electrode active material of claim 1, wherein the first carbonaceous material comprises flake graphite, sheet graphite, graphene, or a combination thereof.

4. The secondary particle-type electrode active material of claim 3, wherein the graphite has an average aspect ratio of about 2 to about 5,000.

5. The secondary particle-type electrode active material of claim 1, wherein an amount of the first carbonaceous material is in a range of about 1 part by weight to about 90 parts by weight, based on 100 parts by weight of the secondary particle-type electrode active material.

6. The secondary particle-type electrode active material of claim 1, wherein an amount of the second carbonaceous material is in a range of about 1 part by weight to about 80 parts by weight, based on 100 parts by weight of the secondary particle-type electrode active material.

7. The secondary particle-type electrode active material of claim 1, wherein an average particle diameter of the silicon material is in a range of about 10 nanometers to about 500 nanometers.

8. The secondary particle-type electrode active material of claim 1, wherein an amount of the silicon material is in a range of about 1 part by weight to about 99 parts by weight, based on 100 parts by weight of the secondary particle-type electrode active material.

9. The secondary particle-type electrode active material of claim 1, wherein a ratio of an amount of the first carbonaceous material to an amount of the silicon material to the second carbonaceous material is (about 40 to about 60 to about 20) to (about 40 to about 5 to about 20).

10. The secondary particle-type electrode active material of claim 1, wherein the shell further comprises a binder.

11. The secondary particle-type electrode active material of claim 10, wherein the first layer, the second layer, or both the first layer and the second layer include the binder, and wherein the binder is pyrolyzed or carbonized.

12. The secondary particle-type electrode active material of claim 10, wherein an amount of the binder is in a range of about 1 part by weight to about 50 parts by weight, based on 100 parts by weight of the secondary particle-type electrode active material.

13. The secondary particle-type electrode active material of claim 1, wherein the first layer and the second layer are continuous layers.

14. The secondary particle-type electrode active material of claim 1, wherein each of the first layer and the second layer independently has a thickness in a range of about 1 micrometer to about 50 micrometers.

15. The secondary particle-type electrode active material of claim 1, further comprising a third layer disposed on the second layer, wherein the third layer comprises the first carbonaceous material.

16. The secondary particle-type electrode active material of claim 15, wherein the electrode active material is in a spherical form.

17. The secondary particle-type electrode active material of claim 15, further comprising a fourth layer disposed on the third layer, wherein the fourth layer comprises an amorphous carbonaceous material.

18. The secondary particle-type electrode active material of claim 1, wherein the secondary particle-type electrode active material is a self-assembled secondary particle-type electrode active material.

19. An electrode comprising the secondary particle-type electrode active material of claim 1.

20. A secondary battery comprising the electrode of claim 19.

21. The method of preparing a secondary particle-type electrode active material, the method comprising:
    spray-drying a slurry comprising a first carbonaceous material, a silicon material, and a second carbonaceous material to form a dried powder; and
    heat treating the dried powder in an inert atmosphere to prepare a secondary particle-type electrode active material,
    wherein the secondary particle-type electrode active material comprises
        at least one pore; and
        a shell surrounding the at least one pore,
    wherein the shell comprises a first layer and a second layer,
        the first layer comprising the first carbonaceous material, and
        the second layer comprising a composite and disposed on the first layer,
        wherein the composite comprises a silicon material and the second carbonaceous material, and
        wherein the second carbonaceous material comprises a carbon nanotube.

22. The method of claim 21, wherein the slurry further comprises a binder.

23. The method of claim 21, wherein a solids content of the slurry is in a range of about 1 weight percent to about 40 weight percent, based on a total weight of the slurry.

24. The method of claim 21, wherein a ratio of the first carbonaceous material to the silicon material to the second carbonaceous material is about 40 to about 60 to about 20 to about 40 to about 5 to about 20.

25. The method of claim 22, wherein an amount of the binder is in a range of about 1 weight percent to about 50 weight percent, based on a total weight of the slurry.

26. The method of claim 21, wherein the spray-drying the slurry comprises spray-drying at a temperature of about 300° C. or less.

27. The method of claim 22, wherein the spray drying comprises selecting a solid content in the slurry, a ratio of the first carbonaceous material to the silicon material to the second carbonaceous material, an amount of the binder, or an amount of a combination thereof to select a pore size of the dried powder.

28. The method of claim 21, wherein the preparing of the secondary particle-type electrode active material of claim 1 comprises a heat-treating at a temperature in a range of about 500° C. to about 1,300° C. in a nitrogen atmosphere.

* * * * *